United States Patent
Fujise et al.

(10) Patent No.: US 6,438,371 B1
(45) Date of Patent: *Aug. 20, 2002

(54) MULTIMODE SERVICE RADIO COMMUNICATION METHOD AND APPARATUS

(75) Inventors: Masayuki Fujise, Ebina; Hiroshi Harada, Yokosuka, both of (JP)

(73) Assignee: Communications Research Laboratory, Independent Administrative Institution, Koganei (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,467

(22) Filed: Apr. 22, 1999

(30) Foreign Application Priority Data

Apr. 23, 1998 (JP) .......................................... 10-129460

(51) Int. Cl.⁷ ................................................ H04Q 7/20

(52) U.S. Cl. ........................ 455/422; 455/216; 455/561

(58) Field of Search ........................... 455/422, 82, 101, 455/99, 269, 19, 561, 553, 560, 216

(56) References Cited

U.S. PATENT DOCUMENTS

| | | | | |
|---|---|---|---|---|
| 4,806,942 A | * | 2/1989 | Ohe et al. | 343/713 |
| 4,823,140 A | * | 4/1989 | Shibata et al. | 343/713 |
| 4,845,505 A | * | 7/1989 | Ohe et al. | 343/712 |
| 4,972,275 A | * | 11/1990 | Spitz et al. | 360/55 |
| 5,708,961 A | * | 1/1998 | Hlton et al. | 455/4.2 |
| 5,822,324 A | * | 10/1998 | Kostresti et al. | 370/487 |

* cited by examiner

Primary Examiner—Daniel Hunter
Assistant Examiner—Thuan T. Nguyen
(74) Attorney, Agent, or Firm—Oblon, Spivak, McClelland, Maier & Neustadt, P.C.

(57) ABSTRACT

A multimode service radio communication apparatus, that provides a hand-held or vehicle-mounted terminal with radio communication and radio broadcasting information of a radio information and communication providing system including mobile communication systems and intelligent transport systems, includes a frequency division multiplexer that integration-converts individual radio or intermediate frequencies modulated for mobile telephones and broadcasts so that the modulated frequencies are included in a specific frequency band, and produces radio signals in the specific frequency band; supply device for supplying the radio signals; an antenna for receiving and transmitting the supplied radio signals; a shared antenna for receiving the transmitted radio signals; and terminals to which specific frequencies in the specific frequency band are selectively linked.

8 Claims, 5 Drawing Sheets

MULTIMODE SERVICE RADIO COMMUNICATION METHOD AND APPARATUS

BACKGROUND OF THE INVENTION

1. Field of the Invention:

The present invention relates to a multimode service radio communication method and apparatus for providing broadcasting and communication services between a base station and individuals or vehicle occupants using a specific common radio frequency band in radio systems including mobile (pocket) telephone communication systems and broadcasting systems, intelligent transport systems, etc.

2. Description of Prior Art:

Mobile telephone communication services and broadcasting services have been provided using specific frequency bands corresponding to the kinds of services and using users' terminals provided with radio-frequency units and antennas corresponding to the respective specific frequency bands. Individuals or vehicle occupants on the users' side have individual transceivers as many as the services, receive broadcasting services and utilize mobile communication.

A prior art radio system scheme for providing services to vehicle occupants is shown in FIG. 5. Its principal services include personal digital cellular. (PDC) communication operating in the 800 MHz or 1.5 GHz frequency band, a vehicle information and communication system (VICS) using a beacon operating in the 2.5 GHz frequency band, frequency modulation (FM) broadcasting operating in the 76 to 90 MHz frequency band, television (TV) broadcasting operating in the 90 to 770 MHz frequency band, and digital broadcasting operating in the 12 GHz frequency band.

In the broadcasting and mobile communication services utilizing the conventional technologies, however, since the frequency bands to be used differ from one another depending on the kind of service, multiple mobile communication terminals and broadcasting receiver terminals are required. A vehicle has to be provided with a separate radio-frequency unit and antenna corresponding to each of the various frequency bands. With future scale-enlargement and introduction of various new services likely, the limited internal space of a vehicle is apt to be insufficient for installation of the required equipment. In addition, the inside of a tunnel, a place surrounded by a soundproof barrier, a valley between tall buildings, etc. still constitute zones not reached by radio waves. Moreover, users have to carry around a plurality of terminals and use the terminals properly in accordance with the service to be received.

One object of the present invention is to provide a multimode service radio communication method and apparatus using a single terminal to receive multimode services of a radio information and communication providing system including a digital broadcasting service, a PDC mobile communication system, and a personal handy-phone system (PHS).

Another object of the present invention is to provide a multimode service radio communication method and apparatus suitable for a vehicle because the apparatus is made simple and compact by integrating a plurality of radio-frequency units and a plurality of antennas into a single radio-frequency unit and a single antenna each usable in common.

SUMMARY OF THE INVENTION

To attain these objects, according to the present invention there is provided a method for providing a hand-held or vehicle-mounted terminal with radio communication and radio broadcasting information of a radio information and communication providing system including mobile communication systems and intelligent transport systems, comprising the steps of integration-converting individual radio or intermediate frequencies modulated for mobile telephones and broadcasts into radio signals in the specific frequency band so that the modulated frequencies are included in a specific frequency band; causing an antenna to transmitting the radio signals to a shared antenna; and selectively linking a specific frequency in the specific frequency band to the hand-held or vehicle-mounted terminal, thereby receiving a communication or broadcasting service of the specific frequency.

The radio signals received by the shared antenna are converted into the individual radio or intermediate frequencies. The converted individual frequencies are allocated to the hand-held or vehicle-mounted terminal.

The radio signals in the specific frequency band are converted into optical signals. The optical signals are transmitted to the antenna via optical fibers and converted into radio signals. The converted radio signals are transmitted from the antenna to the shared antenna.

The present invention also provides a multimode service radio communication apparatus that provides a hand-held or vehicle-mounted terminal with radio communication and radio broadcasting information of a radio information and communication providing system including mobile communication systems and intelligent transport systems, which comprises a frequency division multiplexer that integration-converts individual radio or intermediate frequencies modulated for mobile telephones and broadcasts so that the modulated frequencies are included in a specific frequency band, and produces radio signals in the specific frequency band; supply means for supplying the radio signals; an antenna for receiving and transmitting the supplied radio signals; a shared antenna for receiving the transmitted radio signals; and terminals to which specific frequencies in the specific frequency band are selectively linked; whereby communication or broadcasting services are received using the terminals.

The apparatus is provided with means for converting the radio signals received by the shared antenna into the individual radio or intermediate frequencies and allocating the individual frequencies to the hand-held or vehicle-mounted terminals.

The terminals constitute a multimode terminal. The supply means comprises means for converting the radio signals into optical signals, optical fibers for transmitting the optical signals, and means for receiving the transmitted optical signals, converting the received optical signals into radio signals and transmitting the converted radio signals to the antenna. The shared antenna is mounted on a vehicle.

In the present invention, as described above, since individual radio or intermediate frequencies modulated for mobile telephones and broadcasts are integration-converted so that the modulated frequencies are included in a specific frequency band, a single terminal to which specific frequencies in the specific frequency band are selectively linked is used to receive a plurality of mobile communication and broadcasting services.

Futhermore, since each of a single antenna and a single radio-frequency unit can be used in common, the apparatus can be made compact to enable the apparatus to be advantageously mounted on a vehicle having a small internal space.

The above and other objects, features and advantages of the present invention will become apparent from the description made with reference to the accompanying drawings.

DESCRIPTION OF THE PREFERRED EMBODIMENTS

The present invention will now be described in detail with reference to the accompanying drawings.

Figure 1:
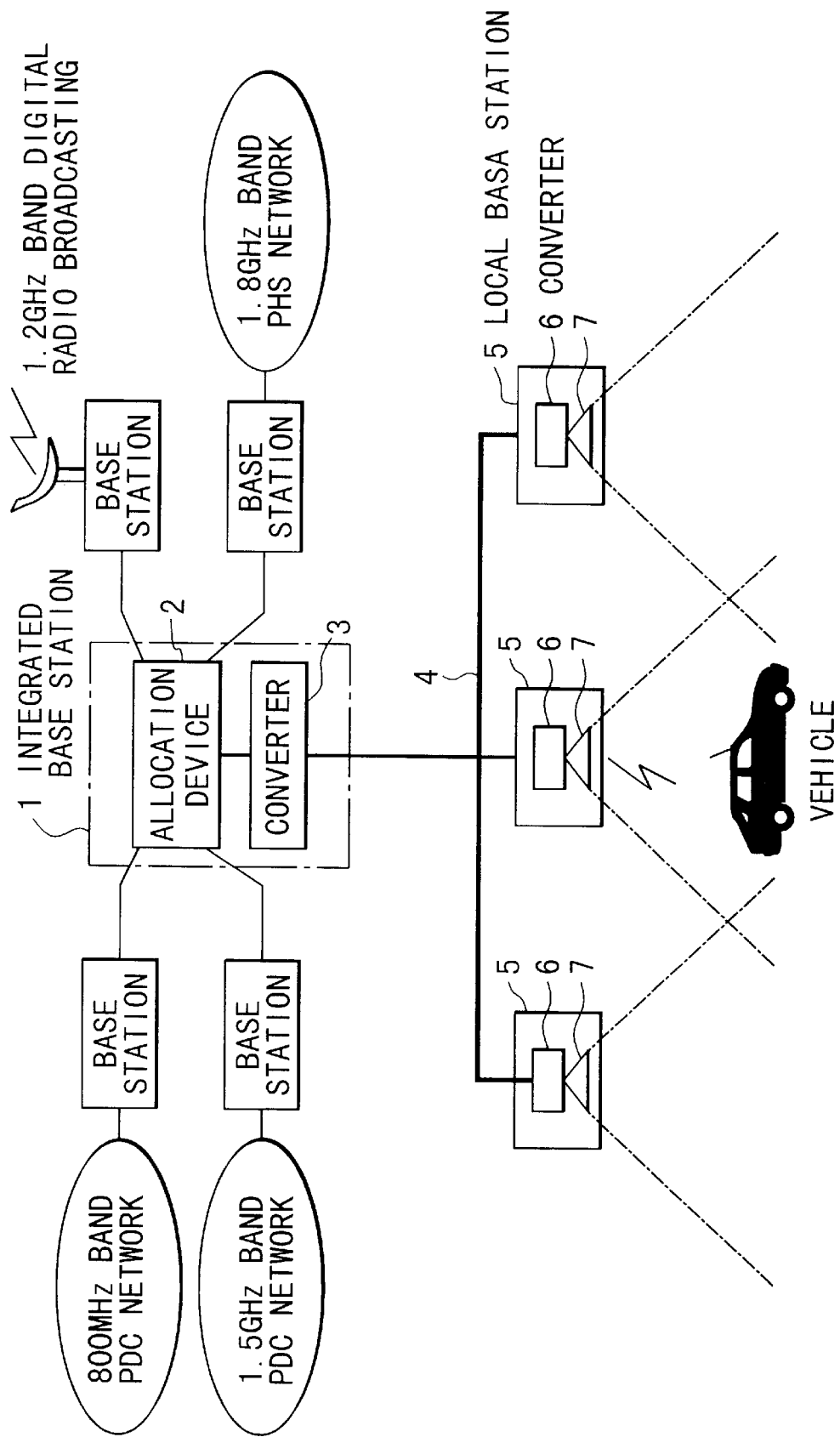
FIG. 1 is a schematic view showing the configuration of an intelligent transport apparatus to which a method according to the present invention is applied.

FIG. 1 is a schematic view illustrating the configuration of an intelligent transport apparatus to which a method according to the present invention is applied. In this figure, reference numeral 1 designates an integrated base station provided with a frequency conversion, integration and allocation device 2 and a radio frequency (RF)/light converter 3 and adapted to transmit optical signals to local base stations 5 through optical fiber transmission paths 4.

Each local base station 5 is equipped with a light/RF converter 6 and a shared antenna 7 for transmitting and receiving radio signals in an integrated frequency band. The radio or intermediate frequencies modulated for services including digital broadcasting services and mobile transmission services that include a personal digital cellular (PDC) service and a personal handy-phone system (PHS) service are converted and multi-integrated by the frequency conversion, integration and allocation device 2 so that the modulated frequencies are included in a specific common frequency band assigned, for example, to an intelligent transport apparatus.

Figure 2:
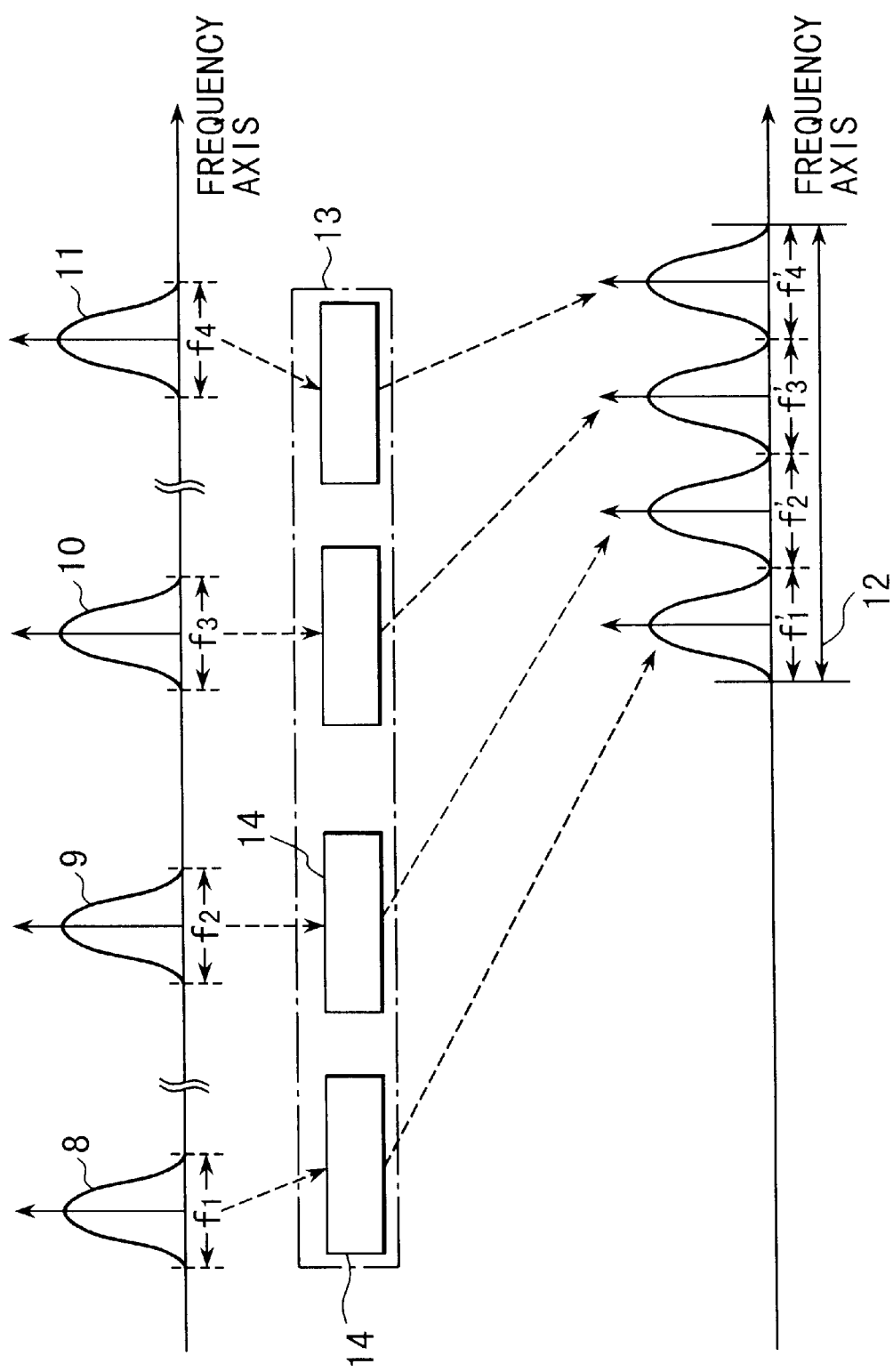
FIG. 2 is an explanatory view showing a frequency division multiplex applied to a frequency conversion, integration and allocation device used in FIG. 1.

As one of the converting methods, integration using a frequency division multiplex is shown in FIG. 2. In this figure, reference numeral 8 denotes the frequency distribution of a PDC mobile telephone operating in the 800 MHz frequency band, numeral 9 that of a PDC mobile telephone operating in the 1.5 GHz frequency band, numeral 10 that of a PHS mobile telephone operating in the 1.8 GHz frequency band, and numeral 11 that of a digital broadcasting system operating in the 12 GHz frequency band; reference numeral 12 denotes a shared frequency band; and reference numeral 13 designates a frequency division multiplexer comprising a plurality of frequency converters 14. The frequency division multiplexer 13 is a component of the frequency conversion, integration and allocation device 2. For example, a frequency bandwidth $f_1$ of the frequency distribution 8 of a PDC mobile telephone operating in the 800 MHz frequency band is converted by a frequency converter 14 into a frequency bandwidth $f'_1$ that is a part of the shared frequency band 12.

The frequency bandwidths $f_1$ to $f_4$ of the frequency distributions 8 to 11 of these services are thus assigned to the shared frequency band 12 as bandwidths $f'_1$ to $f'_4$ by the frequency division multiplexer 13 without damaging their information bandwidths. Frequency bands from the microwave band to relatively high frequency bands such as the Ka band, the milliwave band, etc. can be used as the shared frequency band 12. The assigned signals are converted into optical signals by direct analogue intensity modulation of a laser beam using the RF/light converter 3 of FIG. 1 or by analogue intensity modulation using a laser beam and an external modulator (not shown). The optical signals are then transmitted to the local base stations 5. In each local base station 5, the optical signals are converted by the light/RF converter 6 comprising a photodiode, etc. into radio signals that are transmitted from the shared antenna 7 to a cell zone indicated by one-dot chain lines in FIG. 1.

Figure 3:
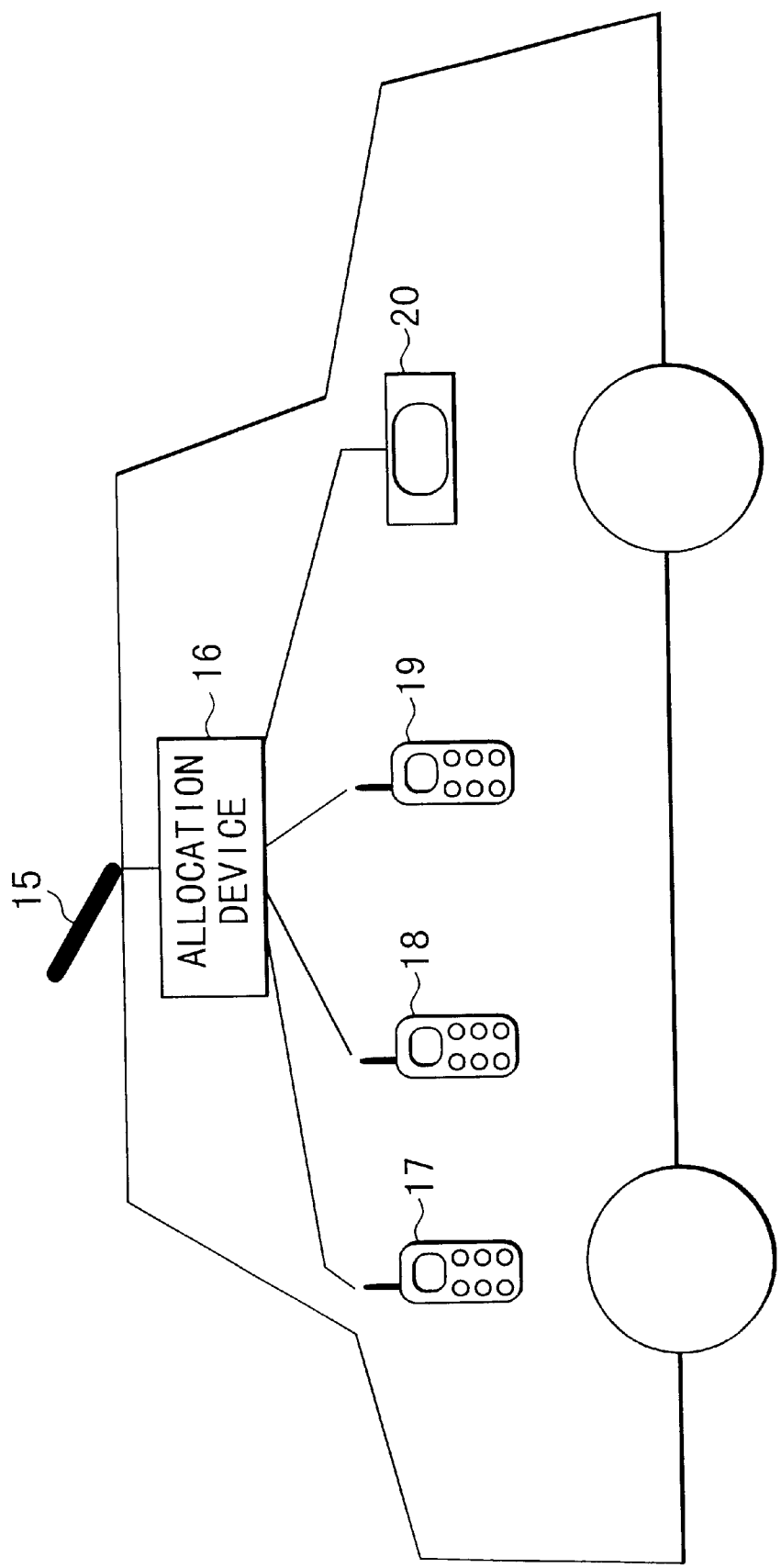
FIG. 3 is a schematic view showing equipment mounted on a vehicle used in FIG. 1 in which the frequency division multiplex is applied to the frequency conversion, integration and allocation device.

Vehicle-mounted equipment is shown in FIG. 3 in which reference numeral 15 denotes a mounted shared antenna that receives the radio signals transmitted from the shared antenna 7 of FIG. 2; numeral 16 a frequency conversion, integration and allocation device that converts the radio signals received by the mounted shared antenna 15 into the original frequencies for the services concerned and allocates the original frequencies; numeral 17 a PDC mobile telephone terminal operating in the 800 MHz frequency band; numeral 18 a PDC mobile telephone terminal operating in the 1.5 GHz frequency band; numeral 19 a PHS mobile telephone terminal operating in the 1.8 GHz frequency band; and numeral 20 a digital broadcasting receiver terminal operating in the 12 GHz frequency band. The radio signals transmitted from the shared antenna 7 of a local base station 5 shown in FIG. 1 are received by the mounted shared antenna 15 shown in FIG. 3. The received radio signals are converted by the frequency conversion, integration and allocation device 16 into the original frequencies for the individual services. The individual radio services can be utilized by allocating the original frequencies to the respective terminals 17–20.

Another mode of operation is also possible, in which the radio signals are converted by the device 16 into intermediate frequencies for the individual services and the intermediate frequencies are allocated to intermediate frequency units of the terminals. This also enables use description is directed to a downlink configuration. However, since the apparatus configuration of the present invention has reversibility, it goes without saying that an uplink configuration from the terminals 17 to 20 to the integrated base station 1 can be attained by following procedures reverse to those effected in the downlink configuration.

According to the present invention, since the shared frequency band 12 is used to integrate the radio frequency bands into a single frequency bandwidth, an antenna mounted on a vehicle can be made shared, it is possible to simplify the integration of mounted equipment. In addition, since cell zones can be continuously formed by the local base stations standing along a road, it is possible to eliminate the problem caused by zones where radio waves cannot be picked up, such as inside a tunnel.

Furthermore, since optical fibers and radio integration transmission technology are used, it is possible to convert radio frequencies into the shared frequency band 12 using the frequency conversion, integration and allocation device 2, then convert the radio frequencies into optical signals using the RF/light converter 3, transmit the optical signals using the optical fiber transmission paths 4 to the local base stations 5, convert the optical signals into the original radio frequencies using the light/RF converter 6, and transmit the original radio frequencies to a vehicle. For this reason, it is unnecessary to alter the radio frequency generating sources, etc. in the local base station 5.

When the bandwidth of the shared frequency band must be extended or the frequency assignment method is to be altered in some way, it is only required to modify the frequency conversion, integration and allocation device 2. Therefore, the system of the present invention is amenable to improvement, such as by addition of a new service and is excellent in expandability. Although the present invention has been described herein with reference to the existing principal services, it is also applicable to other existing mobile telephone services, broadcasting services and new services with different frequency bands.

In addition, the apparatus of the present invention can be used with the RF/light converter 3, optical fiber transmission paths 4, light/RF converter 6, etc. removed from the configuration of FIG. 1 and the shared antenna 7 concerned directly with the frequency conversion, integration and allocation device 2.

Figure 4:
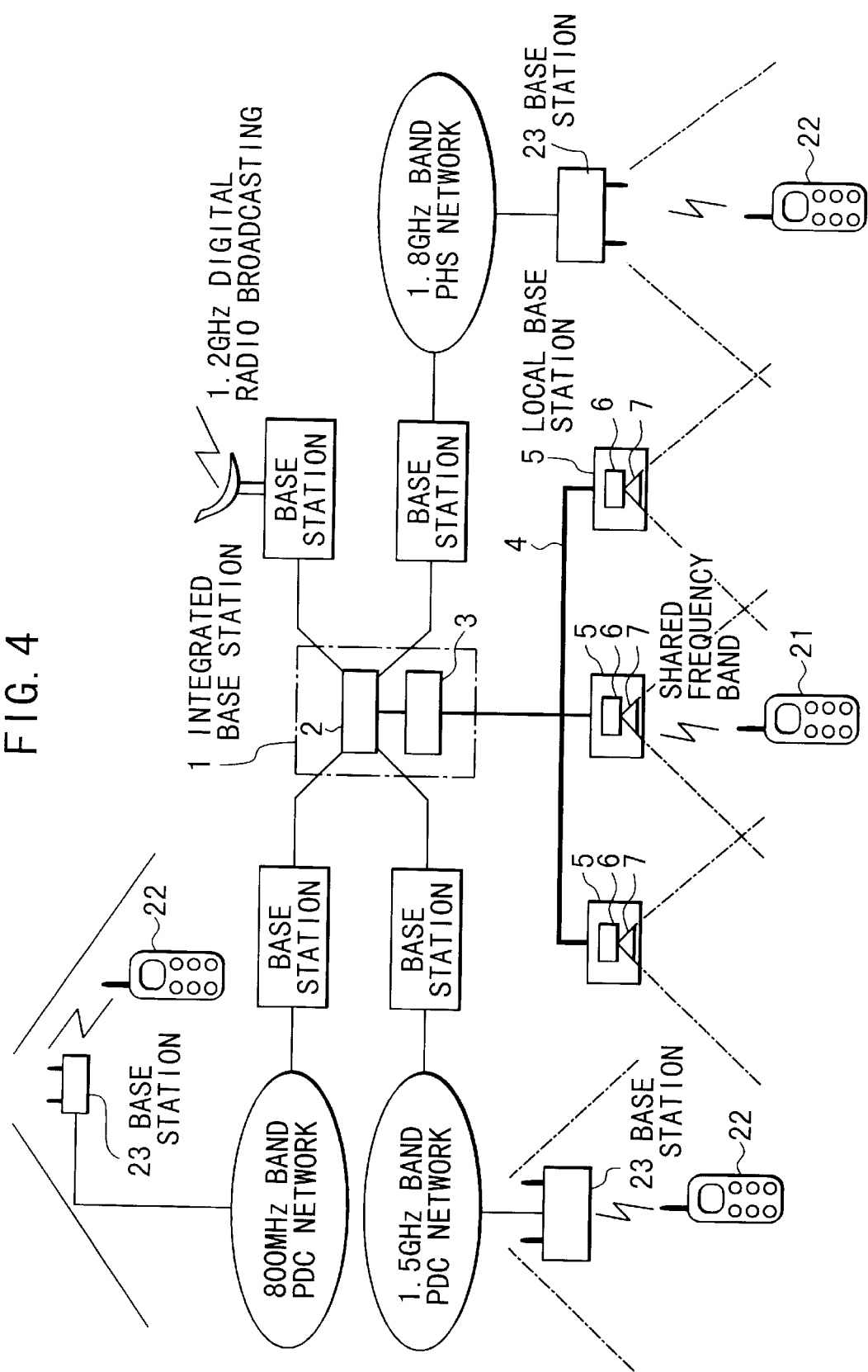
FIG. 4 is a schematic view showing the configuration of a composite radio communication apparatus to which the method according to the present invention is applied.
Figure 5:
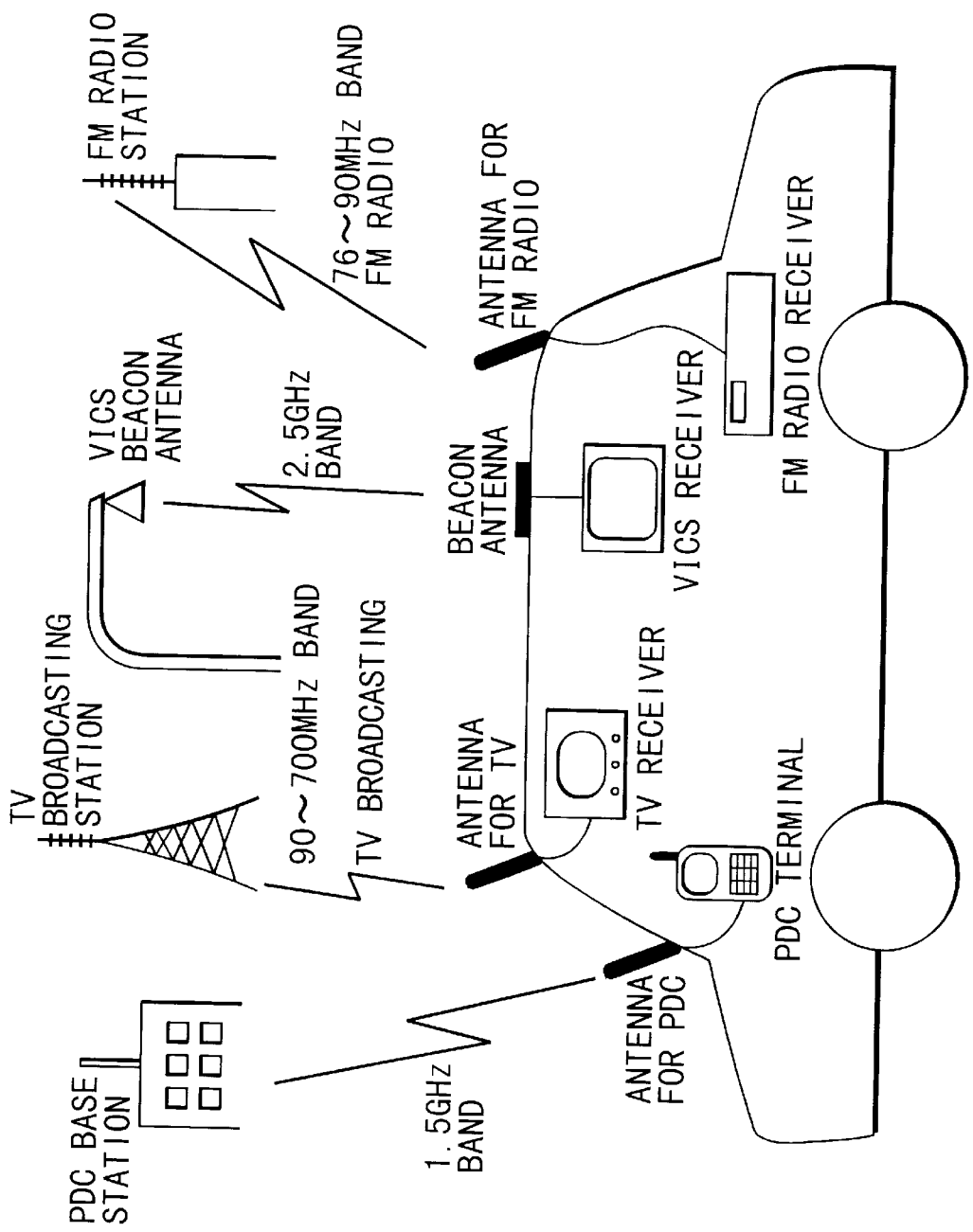
FIG. 5 is an explanatory view showing a conventional scheme of providing mobile communication and broadcasting services to a vehicle.

FIG. 4 is a schematic view showing the configuration of a composite radio communication apparatus to which the method of the present invention is applied, in which reference numeral 21 denotes a multimode terminal, numeral 22 a single mode terminal and numeral 23 single-service base stations. The multimode terminal 21 is equipped with an antenna sensible to a specific integrally-converted frequency band and is capable of being selectively linked with specific frequencies in the specific frequency band. Anyone having the multimode terminal 21 on his or her person, even a pedestrian, for example, can receive various services based on the transmission mode according to the same frequency integration and conversion as in FIG. 1.

The multimode terminal 21 can be fabricated so that the terminal can be linked with individual specific frequencies in the specific frequency band by controlling an execution algorithm of a signal processing circuit within the terminal, using a software radio technique, for example. According to the present invention as shown in FIG. 4, in which the single mode terminal 22 is used to receive a single service from any of the single-service base stations 23 and the multimode terminal 21 is used to receive various services from the local base stations 5, it is possible to provide an advantageous composite radio communication apparatus.

As has been described in the foregoing, the present invention provides an integrated network for providing mobile communication and broadcasting services. Since a shared frequency band into which individual frequency bands for different services are integration-converted is used, the integration of mounted equipment can be simplified. Furthermore, since the present communication apparatus is a combination optical and wave apparatus, if renovation of the apparatus should be called for, it is only required to modify a frequency conversion, integration and allocation device in an integrated base station, a local base station or a vehicle. Moreover, since a multimode terminal is adopted, the apparatus enables a user to receive a plurality of services. Thus, the present invention provides a flexible and efficient radio apparatus.

Although the preferred embodiments of the present invention have been described in detail, it should be understood that various changes, substitutions and alterations can be made therein without departing from spirit and scope of the inventions as defined by the appended claims.

What is claimed is:

1. A multimode service radio communication system comprising an integrated base station, a local base station, and an allocation device, wherein:
    said integrated base station and said local base station are connected to each other via optical fibers and are configured to communicate with each other using the optical fibers; and
    said local base station and said allocation device being configured to communicate with each other using radio; and further wherein,
        said integrated base station is configured to integration-convert plural kinds of signals in respective frequency bands which do not overlap with one another into signals included in a shared frequency band, to convert the signals included in the shared frequency band into optical signals and to transmit the optical signals to said local base station via said optical fibers,
        said local base station is further configured to convert the optical signals transmitted from said integrated base station via said optical fibers into signals in the shared frequency band and to apply the signals in the shared frequency band to an antenna to be radiated therefrom as radio signals, and
        said allocation device comprises a shared antenna, a frequency division multiplexer, and a link unit and is further configured so that:
            said shared antenna is sensitive to the shared frequency band to receive the radio signals radiated from said local base station;
            said frequency division multiplexer division-converts the radio signals received by said shared antenna into plural kinds of signals in the respective frequency bands which do not overlap with one another; and
            said link unit links to an external receiver to send the plural kinds of signals in the respective frequency bands which do not overlap with one another to said external receiver as a signal in a frequency band corresponding to a frequency band of said external receiver.

2. The multimode service radio communication system according to claim 1 further wherein,
    said allocation device further comprises a selection input unit configured to receive a selection input designating which kind of signal to select from the plural kinds of signals to be division-converted by said frequency division multiplexer; and
    when the kind of signal designated by the selection input received by said selection input unit is identical to a kind of a signal in a frequency band of the external receiver linked to said link unit, said link unit sends the signal in the frequency band of said external receiver to said external receiver.

3. The multimode service radio communication system according to claim 1, wherein said link unit is configured to link to the external receiver by radio or via a cable.

4. The multimode service radio communication system according to claim 1, wherein said link unit is linked to said external receiver via a cable when the signal in a frequency band corresponding to said external receiver is an intermediate signal modulated for said external receiver.

5. A multimode service radio communication method comprising the steps of:
    integration-converting plural kinds of signals in respective frequency bands which do not overlap with one another so that those signals are included in a shared frequency band;

converting the signals in the shared frequency band into optical signals;

transmitting the optical signals via optical fibers;

converting the optical signals transmitted via the optical fibers into the signals in the shared frequency band;

emanating the signals in the shared frequency band by radio;

receiving the signals emanated by radio by a shared antenna sensitive to the shared frequency band;

division-converting the signals received by the shared antenna into the plural kinds of signals in the respective frequency bands which do not overlap with one another; and sending the plurality of division-converted signals to an external receiver as a signal in a frequency band corresponding to a frequency band of the external receiver.

6. The multimode service radio communication method according to claim 5, further comprising the step of receiving a selection input designating which kind of signal to select from the plural kinds of signals to be division-converted and when the kind of signal designated by the received selection input is identical to a kind of signal in the frequency band of the external receiver, sending the signal in the frequency band of the external receiver to the external receiver in said sending step.

7. The multimode service radio communication method according to claim 5, wherein said sending step includes sending signals to the external receiver by radio or via a cable.

8. The multimode service radio communication method according to claim 5, wherein in a case where the signal in a frequency band corresponding to the external receiver is an intermediate signal modulated for the external receiver, sending signals to the external receiver via a cable in said sending step.

* * * * *